US006652626B1

(12) United States Patent
Plee

(10) Patent No.: US 6,652,626 B1
(45) Date of Patent: Nov. 25, 2003

(54) AGGLOMERATED ADSORBENT, PROCESS FOR THE PRODUCTION THEREOF AND USE THEREOF FOR THE NON-CRYOGENIC SEPARATION OF INDUSTRIAL GASES

(75) Inventor: Dominique Plee, Lons (FR)

(73) Assignee: CECA, S.A., Puteaux (FR)

( * ) Notice: Subject to any disclaimer, the term of this patent is extended or adjusted under 35 U.S.C. 154(b) by 0 days.

(21) Appl. No.: 09/118,083

(22) Filed: Jul. 17, 1998

(30) Foreign Application Priority Data

Jul. 22, 1997 (FR) .............................. 97 09284

(51) Int. Cl.[7] .............................. B01D 53/047
(52) U.S. Cl. .............................. 95/96; 95/130; 95/140; 95/902; 502/68; 502/79; 502/80; 502/85
(58) Field of Search ................ 95/96–98, 100–105, 95/130, 139, 140, 902; 502/68, 79, 80, 85

(56) References Cited

U.S. PATENT DOCUMENTS

| 3,119,660 A | | 1/1964 | Howell | |
| 3,140,931 A | * | 7/1964 | McRobbie | ................ 95/130 X |
| 3,140,933 A | | 7/1964 | McKee | .......................... 55/68 |
| 3,418,418 A | | 12/1968 | Wilder | |
| 3,906,076 A | | 9/1975 | Goytisolo et al. | .......... 423/118 |
| 4,381,255 A | * | 4/1983 | Nozemack et al. | ....... 502/79 X |
| 4,481,018 A | * | 11/1984 | Coe et al. | ..................... 95/130 |
| 4,544,378 A | * | 10/1985 | Coe et al. | ..................... 95/130 |
| 4,557,736 A | | 12/1985 | Sircar et al. | .................... 55/62 |
| 4,603,040 A | | 7/1986 | Kuznicki et al. | ............ 423/328 |
| 4,859,217 A | | 8/1989 | Chao | .............................. 55/68 |
| 5,152,813 A | * | 10/1992 | Coe et al. | ................. 95/130 X |
| 5,173,462 A | | 12/1992 | Plee | ............................. 502/67 |
| 5,174,979 A | * | 12/1992 | Chao et al. | ................ 95/130 X |
| 5,258,058 A | * | 11/1993 | Coe et al. | .................. 95/130 X |
| 5,268,023 A | * | 12/1993 | Kirner | ....................... 95/130 X |
| 5,419,891 A | * | 5/1995 | Coe et al. | .................. 502/79 X |
| 5,464,467 A | * | 11/1995 | Fitch et al. | ................ 95/130 X |
| 5,531,808 A | * | 7/1996 | Ojo et al. | .................. 95/139 X |
| 5,658,370 A | * | 8/1997 | Vigor et al. | ............... 95/130 X |
| 5,674,311 A | * | 10/1997 | Notaro et al. | .............. 95/130 X |
| 5,868,818 A | * | 2/1999 | Ogawa et al. | ............ 95/130 X |

FOREIGN PATENT DOCUMENTS

| EP | 297542 | 1/1989 |
| EP | 421875 | 4/1991 |
| EP | 486384 | 5/1992 |
| JP | 5-163015 | 6/1993 |
| WO | WO 97/45363 | 12/1997 |

OTHER PUBLICATIONS

French Search Report dated Apr. 8, 1998.
"Zeolite Molecular Sieves", Breck, et al., John Wiley and Sons (to be provided).

* cited by examiner

Primary Examiner—Robert H. Spitzer
(74) Attorney, Agent, or Firm—Smith, Gambrell & Russell, LLP

(57) ABSTRACT

A description is given of agglomerates of faujasite X with an Si/Al ratio of 1, the inert binder of which, on the one hand, has been converted to active zeolite by conversion to zeolite in an alkaline liquor, and which have been subjected, on the other hand, to an exhaustive lithium exchange. These adsorbents develop a nitrogen adsorption capacity (1 bar/25° C.) of at least 26 cm$^3$/g, which makes them excellent adsorbents for the non-cryogenic separation of gases from air and for the purification of hydrogen.

19 Claims, No Drawings

AGGLOMERATED ADSORBENT, PROCESS FOR THE PRODUCTION THEREOF AND USE THEREOF FOR THE NON-CRYOGENIC SEPARATION OF INDUSTRIAL GASES

FIELD OF THE INVENTION

The present invention relates to adsorbents for the non-cryogenic separation of industrial gases and more particularly for the separation of nitrogen by adsorption in gas flows, such as air, and the purification of hydrogen by adsorption of CO and/or $N_2$.

BACKGROUND OF THE INVENTION

The separation of nitrogen from gas mixtures is the basis for several non-cryogenic industrial processes, among which the production of oxygen from air by a PSA process (Pressure Swing Adsorption: adsorption under modulated pressure) is one of the most important. In this application, air is compressed and conveyed through an adsorbing column having a marked preference for the nitrogen molecule. Oxygen, at approximately 94–95%, and argon are thus produced during the adsorption cycle. After a certain period of time, the column is reduced in pressure and then maintained at the low pressure, during which period the nitrogen is desorbed. Recompression is subsequently provided by means of a portion of the oxygen produced and the cycle continues. The advantage of this process with respect to cryogenic processes is the greater simplicity of the plants and their greater ease of maintenance. The quality of adsorbent used is the key to an efficient and competitive process. The performance of the adsorbent is related to several factors, among which may be mentioned: the nitrogen adsorption capacity, which will be determining in calculating the ideal column sizes, the selectivity between nitrogen and oxygen, which will condition the production yield (ratio between the oxygen produced and oxygen entered), and the adsorption kinetics, which will enable the cycle times to be optimized and the productivity of the plant to be improved.

PRIOR ART

The use of molecular sieves as selective adsorbents for nitrogen is a well-known technology. The family of zeolites having a pore diameter of at least 0.4 nm (4 Å) has been provided by McRobbie in U.S. Pat. No. 3,140,931 for the separation of oxygen/nitrogen mixtures. The comparative performance of the various ionic forms of zeolites was examined by McKee in U.S. Pat. No. 3,140,933, in particular that of the lithium form presented as the most efficient in terms of selectivity. The advantage of this zeolite has remained limited due to the difficulty in exchanging the faujasite structure into a lithium form. It is known from Chao (U.S. Pat. No. 4,859,217) that the potentialities of such an adsorbent are fully displayed at high degrees of exchange, typically greater than 88%.

Exchange by means of the calcium ion being easier, efforts have been directed towards calcium-exchanged faujasite structures or towards faujasite structures exchanged by means of two divalent ions, calcium plus strontium (see, for example, Patents U.S. Pat. No. 4,544,378 from Coe and U.S. Pat. No. 4,455,736 from Sircar). In the disclosure by Coe, it is indicated that the state of hydroxylation of the exchanged ions is particularly important with respect to the performances and that this state can be obtained by a specific thermal activation.

The purification of hydrogen by adsorption is also an industrial process of great importance. It relates to the recovery of hydrogen from a mixture of several constituents originating from the catalytic reforming of natural gas, plants for the production of ammonia or ethylene units. The principle of pressure swing adsorption (PSA) is applied in order to obtain hydrogen of high purity. The impurities contained in hydrogen are generally composed of $CO_2$, $NH_3$, $N_2$, CO, $CH_4$ and $C_1$–$C_4$ hydrocarbons, at contents ranging from a few ppm to a few percent. In practice, use is made of a bed composed of alumina or of silica gel, for retaining water, of active charcoal, for retaining $CO_2$ and $CH_4$, and of molecular sieve, for trapping CO and $N_2$.

The first industrial plant, which dates from 1967, is disclosed by UCC in U.S. Pat. No. 3,430,418 and, until now, the zeolitic adsorbent used is a molecular sieve of 5A type.

L'Air Liquide has disclosed, in WO 97/45363, a process for the separation of hydrogen contained in a gas mixture contaminated by CO and containing at least one other impurity chosen from the group consisting of $CO_2$ and saturated or unsaturated, linear, branched or cyclic, $C_1$–$C_8$ hydrocarbons, as well as nitrogen, which comprises bringing the gas mixture to be purified into contact with the bed of a first adsorbent selective for at least carbon dioxide and $C_1$–$C_8$ hydrocarbons, then with the bed of an adsorbent specific to nitrogen (capable of adsorbing most of the nitrogen present in the gas mixture), such as zeolite 5A, and, finally, the bed of a third adsorbent which is a zeolite of the faujasite type exchanged to at least 80% with lithium and in which the Si/Al ratio is less than 1.5, in order to remove the carbon monoxide.

In the light of the importance of non-cryogenic processes for the separation of industrial gases employing molecular sieves, the discovery of increasingly high performance adsorbents is an important objective, both for companies which produce gases and for companies which supply molecular sieves.

SUMMARY OF THE INVENTION

The present invention deals with agglomerated adsorbents. Conventionally, agglomerated adsorbents are composed of a zeolite powder, which constitutes the active component, and of a binder intended to ensure the cohesion of the crystals in the form of grains. This binder has no adsorbing property, its function being to give the grain sufficient mechanical strength for it to withstand the vibrations and movements to which it is subjected during pressurization and pressure-reduction operations of the column.

Various means have been provided for overcoming this disadvantage of the binder being inert with respect to adsorbing performances, including the conversion of the binder, in all or part, into zeolite. This operation is easily carried out when use is made of clays from the kaolinite family, calcined beforehand at temperatures of between 500° C. and 700° C. An alternative form consists in manufacturing pure kaolin grains and in converting them to zeolite: its principle is explained in "Zeolite Molecular Sieves" by D. W. Breck, John Wiley and Sons, New York. The technology in question has been applied with success to the synthesis of grains of zeolite A or X, composed up to 95% by weight of the zeolite itself and of an unconverted residual binder (see, to this end, Howell, U.S. Pat. No. 3,119,660). Other binders belonging to the kaolinite family, such as halloysite, have been converted into zeolite, the addition of a silica source being recommended when it is desired to obtain a zeolite X ("Zeolite Molecular Sieves", Breck, p. 320).

Kuznicki and coworkers have shown (U.S. Pat. No. 4,603,040) that it is possible to convert a kaolin agglomerate into zeolite X with an Si/Al ratio equal to 1. The reaction, in order to be virtually complete, that is to say in order to result in the formation of a grain composed of approximately 95% zeolite X, requires some 10 days at 50° C., however, which makes the operation unfeasible industrially. It is carried out by combining a maturing period of 5 days at 40° C. with a consecutive crystallization at a higher temperature.

JP-05163015 (Tosoh Corp.) teaches that grains of zeolite X with a low Si/Al ratio, of the order of 1.0, can be formed by mixing a zeolite X powder, with an Si/Al ratio of 1, with kaolin, potassium hydroxide, sodium hydroxide and carboxymethylcellulose. Shaping is carried out by extrusion. The grains thus obtained are dried, calcined at 600° C. for 2 hours and then immersed in a sodium hydroxide and potassium hydroxide solution at 40° C. for 2 days.

By following the teachings of these two documents, it is possible to prepare mechanically strong solids mainly composed of zeolite X, the Si/Al ratio of which is substantially less than that of zeolites X conventionally manufactured by the gel route, the Si/Al ratio of which is between 1.1 and 1.5. These processes are inelegant and suffer either from an excessive reaction time or from the number of stages involved. Moreover, it is to be feared that the heat treatment as claimed in JP 05-163015, after the shaping stage, does contribute to the amorphization of the grain and that the object of the caustic digestion which follows is to recrystallize it, which would explain the slowness of the process.

DESCRIPTION OF THE INVENTION

In the present application, the designation LSX (Low Silica X) is reserved for zeolites X with a low Si/Al ratio, namely zeolites X with an Si/Al ratio of 1, reasonable experimental deviations around this unit value being accepted, lower values very definitely corresponding to inaccuracies in the measurement and higher values corresponding to the presence of inevitable impurities with a higher silica content, and containing sodium ions and possibly potassium ions. It is shown here that it is possible to prepare agglomerated zeolitic bodies composed of at least 95% of zeolite LSX by using a much simpler and faster process and that, from these bodies and by lithium exchange, it is possible to prepare adsorbents which have a particularly outstanding performance not only in nitrogen/oxygen separation but also in nitrogen-carbon monoxide/hydrogen separation.

PROCEDURES FOR IMPLEMENTING THE INVENTION

The process whereby agglomerated bodies made of lithium-exchanged zeolite LSX (hereinafter LiLSX) according to the invention are produced comprises the following operations:

a) bodies made of zeolite LSX are subjected to one or more successive exchanges with a lithium chloride solution at a temperature of approximately 100° C., and optionally to exchange of the exchangeable cationic sites of the LSX with ions from Groups IA, IIA, IIIA and IIIB of the Periodic Classification, trivalent ions from the series of lanthanides or rare earth metals, the zinc(II) ion, the cupric(II) ion, the chromic(III) ion, the ferric(III) ion, the ammonium ion and/or the hydronium ion, the preferred ions being the calcium, strontium, zinc and rare earth metal ions, b) the bodies exchanged in a) are repeatedly washed until a low content of chlorides with respect to the solid is achieved (less than 0.02% by weight), c) the products washed in b) are dried and thermally activated according to a method which does not produce hydrothermal degradation of the zeolitic structure, the bodies containing zeolite LSX being the products resulting from the following operations:
   i) agglomerating a zeolite LSX powder with a binder containing at least 80% of a clay which can be converted to zeolite,
   ii) shaping the mixture obtained in i),
   iii) drying it and then calcining it at a temperature of 500 to 700° C., preferably of 500 to 600° C.,
   iv) bringing the solid product resulting from iii) into contact with a caustic aqueous solution,
   v) washing, drying and activating at a temperature of 300 to 600° C., preferably of 500 to 600° C.

Conversion of the binder to zeolite takes place during the stage iv) by the action of the caustic solution, which must be at least 0.5 molar and which can be a sodium hydroxide and potassium hydroxide solution in which the potassium hydroxide is present at a maximum content of 30 molar % (with respect to the combined sodium hydroxide+potassium hydroxide). It can be advantageous to use a sodium hydroxide solution.

When conversion to zeolite is carried out with sodium hydroxide, it is particularly advantageous to carry this out on a column, because it is thus possible to remove the potassium from the structure, the advantage being that, during the subsequent lithium exchange, potassium will not be found in the lithium effluents, which accordingly places less of a burden on their selective recrystallization treatment.

In this case, conversion to zeolite is carried out at a temperature sufficient to obtain a reasonable rate of conversion to zeolite.

The clay which can be converted to zeolite belongs to the kaolinite, halloysite, nacrite or dickite family. Kaolin is very simply used.

The lithium exchange operation and any exchange operations for cationic sites detailed above are carried out under conditions well known to a person skilled in the art. They are advantageously carried out on a column, in order to minimize consumption of lithium and any other cations.

The activation of LiLSXs in c) is recommended according to the method which is particularly respectful of the structure, which is activation by hot air in a column according to Patent EP 0,421,875.

WAYS IN WHICH THE SUBJECT-MATTER IS CAPABLE OF INDUSTRIAL APPLICATION

The agglomerated zeolitic bodies according to the invention for which exchange with lithium and optionally exchange with one or more ions from Groups IA, IIA, IIIA and IIIB of the Periodic Classification, trivalent ions from the series of lanthanides or rare earth metals, the zinc(II) ion, the cupric(II) ion, the chromic(III) ion, the ferric(III) ion, the ammonium ion and/or the hydronium ion has been carried out, the degree of exchange of which, corresponding to the sum of the cationic sites exchanged in the stage a), is greater than or equal to the equivalent of 80% and preferably greater than or equal to 95% of all the cationic sites of the zeolites,
   the lithium representing at least the equivalent of 50% of this total degree of exchange,
   it being possible for the calcium to represent at most the equivalent of 40% of this total degree of exchange,
   it being possible for the strontium to represent at most the equivalent of 40% of this total degree of exchange,
   it being possible for the zinc to represent at most the equivalent of 40% of this total degree of exchange, it being possible for the rare earth metals to represent at most the equivalent of 50% of this total degree of exchange, are excellent adsorbents of nitrogen for the separation of gases from air and excellent adsorbents of nitrogen and/or of carbon monoxide for the purification of hydrogen; agglomerated zeolitic bodies for which the degree of exchange, corresponding to the sum of the cationic sites exchanged in the stage a), is greater than or equal to the equivalent of 95% of all the cationic sites of the zeolites exhibit a nitrogen capacity at 1 bar and at 25° C. greater than or equal to 26 cm$^3$/g and they are particularly preferred by the Applicant. The adsorption processes employed are generally of PSA or VSA type.

EXAMPLES

The following examples illustrate the invention.

Example 1

Preparation of a Faujasite LSX According to the Prior Art in the Presence of Potassium Hydroxide A zeolite of faujasite type and with an Si/Al ratio of 1 is synthesized by mixing the following solutions.
Solution A:

136 grams of sodium hydroxide and 73 grams of potassium hydroxide (expressed on a pure basis) are dissolved in 280 grams of water. The solution is brought to boiling point between 100–115° C. and then 78 grams of alumina are dissolved. Once dissolution has been carried out, the solution is allowed to cool and is made up to 570 grams with water, in order to take into account the water evaporated.
Solution B:

300 grams of water and 235.3 grams of sodium silicate (25.5% as SiO$_2$, 7.75% as Na$_2$O) are mixed with gentle stirring. The silicate solution is added to the aluminate solution over approximately 2 minutes with vigorous stirring by means of a deflocculating turbine mixer of Rayneri type rotating at 2500 revolutions/minute (peripheral speed= 3.7 m/s) and then the gel formed is left at 60° C. for 24 hours without stirring. After this period of time, significant separation by settling is observed, characteristic of the crystallization process. The mixture is then filtered and the residue is washed with approximately 15 ml of water per gram of solid. The latter is subsequently dried at 80° C. in an oven. The composition of the synthetic gel is:

4Na$_2$O.1.3K$_2$O.1Al$_2$O$_3$.2SiO$_2$.91H$_2$O

Chemical analysis of the solid resulting from the synthesis provides a composition:

0.77Na$_2$O.0.23K$_2$O.2SiO$_2$.1Al$_2$O$_3$

Analysis by X-ray diffraction confirms that the powder formed is composed of virtually pure faujasite, accompanied by traces of zeolite A, the content of which is estimated at less than 2%. Toluene adsorption capacity is measured after calcination at 550° C. for 2 hours under an inert atmosphere: a capacity of 22.5% at 25° C. and under a partial pressure of 0.5 is found.

Example 2

Preparation of an Agglomerated LiLSX

Part of the powder is shaped by mixing 42.5 grams (expressed as calcined equivalent), 7.5 grams of a fibrous clay (expressed as calcined equivalent), 1 gram of carboxymethylcellulose and enough water to be able to extrude in the form of extrudates with a diameter of 1.6 mm and a length of approximately 4 mm. The extrudates are dried at 80° C. and are subsequently calcined at 550° C. for 2 hours under an inert atmosphere. Five successive exchanges are then carried out by means of 1M lithium chloride solutions, in the proportion of 20 ml/g of solid. Each exchange is continued for 4 hours at 100° C. and intermediate washing operations are carried out which make it possible to remove the excess salt at each stage. In the final stage, 4 washing operations are carried out at room temperature, in the proportion of 20 ml/g, so as to reduce the level of residual chlorides on the sieve to less than 0.05%. The resulting solid is characterized according to the following tests:

| | |
|---|---|
| Toluene adsorption capacity (25° C., P/Po = 0.5) | 21% |
| Degree of Li exchange (%) (expressed by Li$_2$O/(Li$_2$O + K$_2$O + Na$_2$O) | 98.4% |

Example 3

Preparation of an Agglomerated LSX Containing a Binder which has been Converted to Zeolite According to the Invention The powdered zeolite LSX of Example 1 is used by agglomerating it with a mixture of a clay of montmorillonite type (15%), of a clay of kaolin type (85%), of a small amount of carboxymethylcellulose and of water. After extrusion, drying is carried out at 80° C. and calcination is carried out at 600° C. for 2 hours under an inert atmosphere which is free of water vapour.

A solution containing 16.7 grams of sodium hydroxide pellets and 7.7 grams of potassium hydroxide (expressed on a pure basis) is prepared in 100 ml of water. 10 grams of freshly calcined grains of zeolite are immersed in 17 ml of this solution and the whole mixture is brought to 95° C. without stirring.

Samples of solid are taken after 3, 6 and 24 hours, in order to monitor the change in crystallinity as a function of time. Each of these samples is washed by immersion in water in the proportion of 20 ml/g; the agglomerated LSX is washed 4 times.

Toluene adsorption capacity measurements are carried out under the conditions described above and the following values are found:

| | |
|---|---|
| Agglomerated LSX (NaOH + KOH untreated) | 18.2% |
| Agglomerated LSX (NaOH + KOH treated, reaction for 3 h) | 21.7% |
| Agglomerated LSX (NaOH + KOH treated, reaction for 6 h) | 21.6% |
| Agglomerated LSX (NaOH + KOH treated, reaction for 24 h) | 21.6% |

The X-ray diagrams show essentially the presence of faujasite, with some traces of zeolite A in an amount similar to that measured on the powder before agglomeration. Chemical analysis results in an overall Si/Al ratio of 1.04, corresponding to the desired objective. The Si/Al ratio, measured by silicon N.M.R., is 1.01 and corresponds to the ratio in the crystal lattice.

It is thus demonstrated that it is possible to obtain LSX grains with a content of zeolite of faujasite type of at least 95%, on the basis of the adsorption capacities. At the same time, it is demonstrated that the reaction can be fast (less than 3 hours), that it does not require a maturing period and that it does not require a large amount of a pore-forming agent, as claimed in U.S. Pat. No. 4,603,040.

The solid resulting from the process is subjected to the same exchange procedure as that described in Example 1 and an adsorbent is thus obtained which has the following characteristics:

| | |
|---|---|
| Toluene adsorption capacity (25° C.-P/Po = 0.5) | 23.9% |
| Degree of Li exchange (%) (expressed by $Li_2O/Li_2O + Na_2O + K_2O$) | 98.1% |

Example 4

Preparation of an Agglomerated LiLSX Containing a Binder Converted to Zeolite According to the Invention

The powdered zeolite LSX of Example 1 is used by agglomerating it with a mixture of a clay of montmorillonite type (15%), of a clay of kaolin type (85%), of a small amount of carboxymethylcellulose and of water. After extrusion, drying is carried out at 80° C. and calcination is carried out at 600° C. for 2 hours under an inert atmosphere which is free of water vapour.

10 grams of these agglomerates are immersed in 17 ml of a 220 g/l sodium hydroxide solution for 3 hours at 95° C. The agglomerates are subsequently washed four times by immersion in water.

Toluene adsorption capacity measurements are carried out under the conditions described above and the following values are found:

| | |
|---|---|
| Agglomerated LSX (untreated) | 18.2% |
| Agglomerated LSX (NaOH treated) | 22.4% |

This agglomerated LSX has a better toluene capacity, which is a reflection of a better crystallinity, than that of the preceding example. Moreover, it is confirmed by silicon N.M.R. that the Si/Al ratio of the crystal lattice is 1.01.

The solid resulting from the process is subjected to the same exchange procedure as that described in Example 1 and an adsorbent is thus obtained with the following characteristics:

| | |
|---|---|
| Toluene adsorption capacity (25° C.-P/Po = 0.5) | 24.3% |
| Degree of Li exchange (%) (expressed by $Li_2O/Li_2O + Na_2O + K_2O$) | 98% |

Example 5

The lithium-containing adsorbents of Examples 2, 3 and 4 are tested by measuring their nitrogen and oxygen adsorption isotherms at 25° C., after degassing at 300° C. for 15 hours under a vacuum of 0.002 mm Hg. The results are summarized hereinbelow:

| | $N_2$ Cap. (1 bar) (cm³/g) | C $N_2$/C $O_2$ |
|---|---|---|
| Control adsorbent (Example 2) | 23 | 6.5 |
| Adsorbent (Example 3) | 26.3 | 6.9 |
| Adsorbent (Example 4) | 26 | 6.9 |

It is concluded therefrom that the adsorbents according to the invention are superior to the known adsorbents, mainly because of their better adsorption capacity, which is greater than 26 cm³/g.

Example 6

Preparation of an Agglomerated LiLSX and of an Agglomerated LiCaLSX Containing a Binder Converted to Zeolite According to the Invention

The agglomerated LSX prepared in Example 3 is exchanged by means of a 1M lithium chloride solution at 100° C. and an agglomerate is obtained for which the degree of lithium exchange is 91% ($Li_{91}LSX$)

This agglomerate is subsequently treated by means of a 0.23M calcium chloride solution for one hour at 70° C. Once the operation has been carried out, the product is filtered and washed with 10 ml of water per gram of agglomerate. The agglomerate obtained has an overall degree of lithium+ calcium exchange of 91%, divided into 69% of lithium and 22% of calcium ($Li_{69}Ca_{22}LSX$).

The CO and nitrogen adsorption capacities are measured at 30° C. after having calcined the agglomerates at 550° C. under air for 2 hours and then after having degassed them under vacuum at 300° C.

The results are reported in the table below, on the one hand as adsorption capacities for the two gases at a pressure of 1 bar and, on the other hand, as ratios of capacities at 1 bar and at 0.2 bar, which provides information on the curve of the isotherm.

| | CO (1 bar) (mmol/g) | CO (1 bar)/ CO (0.2 bar) | $N_2$ (1 bar) (mmol/g) | $N_2$ (1 bar)/ $N_2$ (0.2 bar) |
|---|---|---|---|---|
| Agglomerated $Li_{91}LSX$ | 1.71 | 1.86 | 0.83 | 3.49 |
| Agglomerated $Li_{69}Ca_{22}LSX$ | 1.71 | 1.8 | 0.81 | 3.40 |

These results show that the (lithium+calcium)–exchanged agglomerated adsorbent behaves as an agglomerated adsorbent exchanged solely with lithium for the adsorption of CO and of $N_2$.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. Process for producing agglomerated bodies made of zeolite composed of at least 95% of lithium-exchanged zeolite X having an Si/Al ratio equal to 1, which process comprises the following operations:
   a) bodies made of zeolite LSX are subjected to one or more successive exchanges with a lithium chloride solution at a temperature of approximately 100° C.
   and optionally to exchange of the exchangeable cationic sites of the LSX with ions from Groups IA, IIA, IIIA and IIIB of the Periodic Table of Elements, trivalent ions from the series of lanthanides or rare earth metals, the zinc(II) ion, the cupric(II) ion, the chromic(III) ion, the ferric(III) ion, the ammonium ion and/or the hydronium ion,
   b) with repeated washing of the bodies exchanged in a)
   c) with drying and with thermal activation of the products washed in b),
   wherein the bodies made of zeolite LSX are the products resulting from the following operations:
      i) agglomerating a zeolite LSX powder with a binder containing at least 80% of a clay optionally convertable to zeolite,
      ii) shaping the mixture obtained in i),
      iii) drying it and then calcining it at a temperature of 500 to 700° C.,
      iv) bringing the solid product resulting from iii) into contact with an at least 0.5 molar caustic aqueous solution,
      v) washing, drying and activating at a temperature of 300 to 600° C., according to a method which does not produce hydrothermal degradation of the zeolitic structure.

2. Process according to claim 1, wherein the caustic solution is a sodium hydroxide and potassium hydroxide solution in which the potassium hydroxide is present at a maximum content of 30 molar %, with respect to the combined sodium hydroxide+potassium hydroxide.

3. Process according to claim 1, wherein the caustic solution is a sodium hydroxide solution.

4. Process according to claim 1, wherein the binder for optional conversion to zeolite belongs to the kaolinite, halloysite, nacrite or dickite family.

5. Process according to claim 4, wherein the binder for optional conversion to zeolite is kaolin.

6. Agglomerated bodies made of zeolite composed of at least 95% of lithium-exchanged zeolite X having an Si/Al ratio equal to 1, which bodies are optionally exchanged with one or more ions from Groups IA, IIA, IIIA and IIIB of the Periodic Table of Elements, trivalent ions from the series of lanthanides or rare earth metals, the zinc(II) ion, the cupric (II) ion, the chromic(III) ion, the ferric(III) ion, the ammonium ion and/or the hydronium ion and which are obtained according to the process of claim 1.

7. Agglomerated bodies made of zeolite according to claim 6, wherein lithium represents at least the equivalent of 50% of the total degree of exchange.

8. Agglomerated bodies made of zeolite according to claim 6 which are exchanged with calcium and/or with strontium and/or with one or more rare earth metals.

9. Agglomerated bodies made of zeolite according to claim 6, having a nitrogen capacity of 1 bar and at 25° C. of greater than or equal to 26 $cm^3/g$.

10. Method for non-cryogenic separation of industrial gases comprising the steps of:
   i) exposing a mixture of gases to the agglomerated bodies made of zeolite as defined in claim 6, the degree of exchange of which, corresponding to the sum of the cationic sites exchanged in the stage a), is greater than or equal to the equivalent of 80% of all the cationic sites of the zeolite, whereby
   lithium representing at least the equivalent of 50% of the total degree of exchange,
   calcium representing at most the equivalent of 40% of the total degree of exchange,
   strontium representing at most the equivalent of 40% of the total degree of exchange,
   zinc representing at most the equivalent of 40% of the total degree of exchange,
   rare earth metals representing at most the equivalent of 50% of the total degree of exchange,
   as adsorbents in the non-cryogenic separation of industrial gases; and
   ii) recovering a purified gas.

11. Method according to claim 10, wherein the agglomerated bodies being made of zeolite for the adsorption of nitrogen in the separation of gases from air.

12. Method according to claim 10, wherein the agglomerated bodies being made of zeolite for the adsorption of nitrogen and/or of carbon monoxide in the purification of hydrogen.

13. Method according to claim 10, wherein the agglomerated bodies being made of zeolite in process of PSA or VSA.

14. Method according to claim 10, wherein the degree of exchange is greater than or equal to 95%.

15. Process according to claim 1, wherein the ions being calcium, strontium, zinc or rare earth metal ions, the calcining temperature is between 500 to 600° C., and the activating temperature being between 500 and 600° C.

16. Agglomerated bodies made of zeolite according to claim 6, wherein the degree of exchange of which, corresponding to the sum of the cationic sites exchanged in the stage a), is greater than or equal to the equivalent of 80% of all the cationic sites of the zeolite.

17. Agglomerated bodies made of zeolite according to claim 6, wherein the degree of exchange of which, corresponding to the sum of the cationic sites exchanged in the stage a), is greater than or equal to the equivalent of 95% of all the cationic sites of the zeolite.

18. Process according to claim 1, wherein the degree of exchange of which, corresponding to the sum of the cationic sites exchanged in the stage a), is greater than or equal to the equivalent of 80% of all the cationic sites of the zeolite.

19. Process according to claim 1, wherein the degree of exchange of which, corresponding to the sum of the cationic sites exchanged in the stage a), is greater than or equal to the equivalent of 95% of all the cationic sites of the zeolite.

* * * * *

UNITED STATES PATENT AND TRADEMARK OFFICE
CERTIFICATE OF CORRECTION

PATENT NO.     : 6,652,626 B1
DATED          : November 25, 2003
INVENTOR(S)    : Dominique Plee It is certified that error appears in the above-identified patent and that said Letters Patent is hereby corrected as shown below:

Column 1,
Line 61, delete "Pat. No. 4,455,736" and insert -- Pat. No. 4,557,736 --.

Signed and Sealed this

Twenty-seventh Day of April, 2004

JON W. DUDAS
*Acting Director of the United States Patent and Trademark Office*